Feb. 13, 1951  M. SORKIN  2,541,555
STEREOSCOPIC CAMERA
Filed July 30, 1947  2 Sheets-Sheet 1
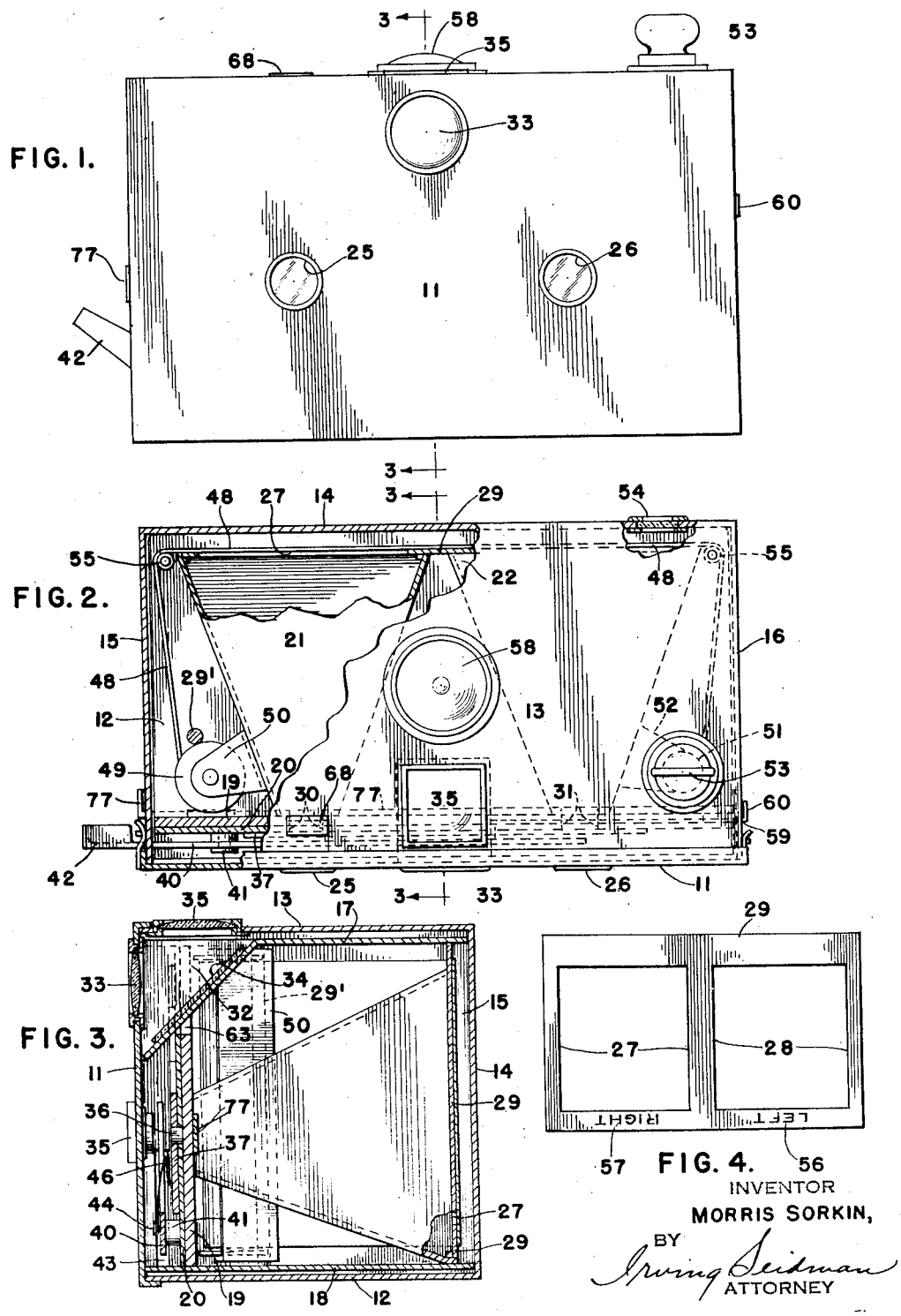
INVENTOR
MORRIS SORKIN,
BY
Irving Seidman
ATTORNEY Feb. 13, 1951 M. SORKIN 2,541,555
STEREOSCOPIC CAMERA
Filed July 30, 1947 2 Sheets-Sheet 2
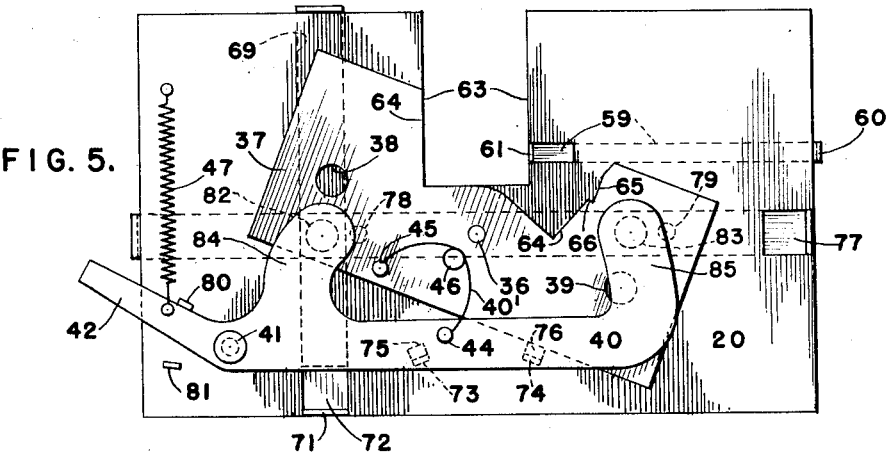
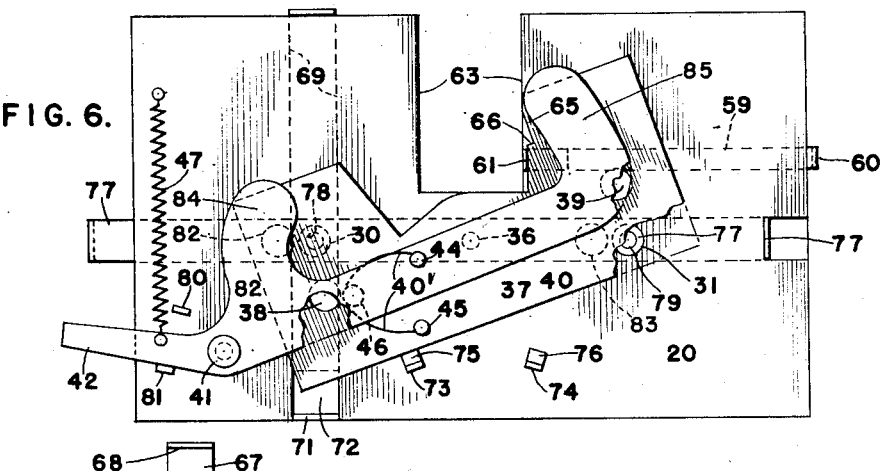
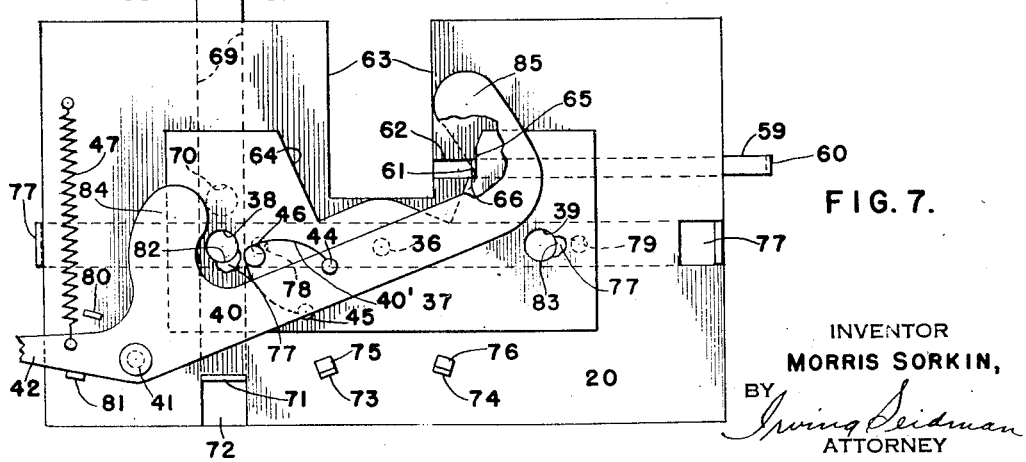
INVENTOR
MORRIS SORKIN,
BY Irving Seidman
ATTORNEY Patented Feb. 13, 1951

2,541,555

UNITED STATES PATENT OFFICE 2,541,555

STEREOSCOPIC CAMERA

Morris Sorkin, New York, N. Y.

Application July 30, 1947, Serial No. 764,621

1 Claim. (Cl. 95—18)

This invention relates to improvements in cameras and has particular reference to the type of cameras used for simultaneously making two exposures to produce a stereoscopic picture.

One object of this invention is the provision in a camera of the type set forth, of a shutter mechanism adapted to make a single or dual snap-shot or time exposure.

Another object of this invention is the inclusion therein of a means for automatically marking the left and right film and print in a stereoscopic exposure.

Another object of this invention is the provision therein of a damping means to absorb the force of the impact of the shutter when it is snapped from closed through open position and vice versa so as to avoid violent rebound which would cause repeated exposure of the film.

A further object of this invention is the inclusion therein of a means for indicating the level position, or horizontal alinement, of the camera when taking a picture with same.

A still further object of this invention is the provision of a device in which the constituent elements are so arranged structurally and functionally as to assure improved results with materials and members which may be manufactured at reasonable cost, may be easily assembled and which will be efficient in operation with minimum wear to the parts.

The invention possesses other objects and features of advantage, some of which, with the foregoing will be set forth in the following description and in the claims wherein parts will be identified by specific names for convenience, but they are intended to be as generic in their application to similar parts as the art will permit. In the accompanying drawings, there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, in which:

Figure 1 is a front elevational view of the camera.

Figure 2 is a top view of same with part of the upper casing broken away.

Figure 3 is a sectional elevational view taken along lines 3—3 of Figures 1 and 2.

Figure 4 is a detail view of a part of same and is shown in reduced size.

Figures 5, 6 and 7 are elevational views of the shutter carrying plate and shows various shutter positions which will be hereinafter described.

Referring in detail to the parts, 11 designates the removable front cap or closure member of a housing having a bottom 12, top 13, rear wall 14 and side walls 15 and 16.

Removably housed within the casing is a frame having top and bottom members 17 and 18 respectively and a front wall member 19 which is faced with a metallic plate 20 in turn secured to the said front wall member 19. Funnel shaped or tapered projection boxes 21 and 22 are secured between the said top member 17 and bottom member 18 and are adapted to project light rays from the lenses 25 and 26 respectively through apertures 27 and 28 in the rear wall 29 of the said removable frame. Rods 29' upon each side of the said removable frame extend between the top and bottom members 17 and 18 to securely hold the parts together. Apertures 30 and 31 are formed in said front wall 19 and plate 20 and are alined with the said lenses 25 and 26.

A regulation sighting means is provided which consists of a box 32 comprising a lens 33 in the said removable front 11, a mirrored reflecting surface 34 upon the said removable frame and an observation lens 35 mounted in the top 13 of the said housing. The mirrored surface 34 being arranged at an angle of 45 degrees to reflect the rays projected through the lens 33 upwardly through the lens 35.

To the front plate 20 there is pivotally attached at 36, a shutter element 37 having apertures 38 and 39 and is adapted to rotary movement about its pivotal connection with the plate 20. (See Figures 5, 6 and 7.) During its rotary movement, the apertures 38 and 39 in the said shutter 37, will pass and coincide with the apertures 30 and 31 respectively, in the said front wall 19 and plate 20. Movement is given to the said shutter by means of a lever 40 which is pivotally attached to the plate 20 as at 41 and has formed upon it a short arm 42 which engages through a slot 43 in the side wall 15 (Figure 3).

The said shutter 37 and lever 40 are connected by means of a V-shaped spring 40', one arm of which is pivotally attached to the lever 40 at 44 and its other arm is attached to the shutter 37 at 45. The said V-shaped spring has a spiral or loop formation as at 46. Normally the shutter 37 and its connected lever 40 maintain the position shown in Figure 5. In this position the ears 84 and 85 of the lever 40 cover the apertures 30 and 31 in the front wall 19 and plate 20. A spring 47, secured to arm 42 and plate 20 acts to keep the shutter in its normal or inoperative position. The pressure exerted between the arms of the said V spring 40', when the shutter is in its normally closed position is outward relatively with its connection to the lever 40. However, when the arm 42 is depressed, the lever 40 moves upwardly and assumes the position shown in Figure 6 and during this upward movement of the lever 40, the ears 84 and 85 expose the positions of the apertures 30, 31, the ends 44 and 45 of the V-shaped spring 40' are brought together thereby increasing the outward pressure of the spring arms until the pressure exerted by the arms of the V spring are outward and downward relatively with its lever connection, whereupon the shutter will snap from the position shown in Figure 5 to the position shown in Figure 6. As the shutter snaps from the first mentioned to the second mentioned position, the apertures 38 and 39 will flash by the coinciding apertures of the lens 25 and 26 and apertures 30 and 31 respectively in the plate 20 and wall 19 to permit the light rays passing through the lens openings to reach a sensitized photographic film 48. When the arm 42 is released the lever 40 returns to the position shown in Figure 5 and during this downward movement the ears 84, 85 cover the apertures 30, 31 before the shutter 37 snaps back to the normal inoperative position shown in Figure 5. Therefore during the return movement of the shutter 37 the apertures 30, 31 are not uncovered and the film is not exposed to light. The said film is fed from a spool 49 mounted in any suitable spring clip 50 and wound in the conventional manner upon a second spool 51 which is held in a spring clip 52. A handle or knob 53 of the conventional type engages the said spool 51 to move the film along after each exposure. A peep hole 4 also of conventional type, is provided in the rear wall 14 of the housing to permit proper placement of the film. Rollers 55 are provided around which the film is guided. The apertured rear wall 29 is formed with stenciled letters 56 and 57 which read "right"—"left" with the letters arranged in reverse order. When the film in the camera is exposed the letters will be impressed upon the film which when developed and printed will read in correct letter arrangement to indicate the left and right hand pictures when viewed in a conventional stereoscopic viewer.

A leveling unit 58 is mounted upon the top of the housing and provides a means to enable the user to hold the camera in perfect horizontal and vertical alinement so as to maintain horizontal and vertical presentation of the three dimensional picture seen by the viewer of the pair of pictures.

Referring again to Figures 5, 6 and 7, there is shown a means for setting the camera for time exposures. A flat bar 59 having an outer end piece 60 and an inner turned up lug 61 is adapted to slide behind the plate 20 and when pulled out to the position shown in Figure 7, the lug 61 engaging through a slot 62, will act as a stop to limit the movement of the shutter 37 (Figure 7). The front wall 19 and its adjacent plate 20 are cut away as at 63 to allow clearance around the sighting unit 32. The shutter 37 is also cut away as at 64 to clear the said sighting unit and a notch 65, having a shoulder 66 on one side of the cut out section 66, engages the lug 61 upon the bar 59 when same is drawn out as indicated in Figure 7. When the bar 67 is in the position shown in Figure 6 the camera is set to simultaneously expose two pictures, or a stereoscopic pair, but when the bar 67 is pulled out as shown in Figure 7, the aperture 30 is covered so that only one picture is exposed. When the bar 59 is pulled out as shown in Figure 7, and the shutter 37 and lever 40 are in the position shown in Figure 5, the camera is set for a time exposure.

A second flat bar 67 having a finger pull 68 upon its outer end slideably engages in a groove 69 upon the wall 19 and is formed with an aperture 70 which is normally alined with the aperture 30 in the said front wall 19 and plate 20 but closes the aperture 30 when the said bar is pulled out as indicated in Figure 7. A turned up end 71 engaging in slot 72 acts as a stop means to limit the outward movement of the bar 67.

By depressing the arm 42, the shutter 37 is snapped from its closed position shown in Figure 5 to the position shown in Figure 7 thereby permitting a single exposure through the lens 26 and said alined apertures 39 and 31. A time exposure through both lenses 25 and 26 and alined apertures may be accomplished by resetting the bar 67 to bring the aperture 70 into alinement with the shutter orifice 38.

Stop elements 73 and 74 having resilient plastic pads 75 and 76 respectively are provided upon the plate 20 and are adapted to absorb the striking force of the shutter when same snaps into its closed or open position and so avoid rebound. An aperture changing bar 77, having large apertures 82, 83 and small apertures 78 and 79 is adapted to be pulled out to bring the said small apertures 78 and 79 in line with the apertures 30, 38 and 31, 39 to admit light through the said lens 25 and 26 when required for correct exposure of the film.

Stop means 80 and 81 are provided upon the plate 20 and afford a means to limit the movement of the arm 42 and lever 40.

I claim:

A stereoscopic camera comprising an outer casing, a detachable front cap member having lenses mounted in apertures thereon, a removable housing within the casing, a front wall in said housing having apertures alined with said lens apertures in said detachable front member, tapered projection boxes within the said housing and extending from the said front wall to the opposite open end of said housing, a film roll mounted in said housing and moving over open ends of said tapered projection boxes, an oscillating shutter pivotally mounted upon said front wall and having apertures adapted to aline with said lens and lens apertures, a manually operated shutter lever pivoted to said front wall and formed with masking ears which normally close the said apertures in said front wall, a V-spring connecting the said shutter and shutter lever to give snap action to said shutter, a spring connecting the said shutter lever to the said housing to hold the said shutter lever and shutter in normally aperture closing position, and an aperture closing bar slidably mounted in said front wall of housing and adapted to close one series of apertures and permit taking single exposure pictures.

MORRIS SORKIN.

REFERENCES CITED

The following references are of record in the file of this patent:

UNITED STATES PATENTS

| Number | Name | Date |
|---|---|---|
| 709,480 | Goerz | Sept. 23, 1902 |
| 738,066 | Reichenbach | Sept. 1, 1903 |
| 816,907 | Garfield | Apr. 3, 1906 |
| 1,364,462 | Stout | Jan. 4, 1921 |
| 1,855,269 | Victor | Apr. 26, 1932 |
| 2,286,810 | Ingels | June 16, 1942 |
| 2,328,677 | Ringer | Sept. 7, 1943 |
| 2,361,661 | Sparling | Oct. 31, 1944 |